(12) United States Patent
Salinger et al.

(10) Patent No.: US 9,986,062 B2
(45) Date of Patent: *May 29, 2018

(54) QUALITY OF SERVICE FOR DISTRIBUTION OF CONTENT TO NETWORK DEVICES

(71) Applicant: Comcast Cable Communications, LLC, Philadelphia, PA (US)

(72) Inventors: Jorge Daniel Salinger, Littleton, CO (US); Mark Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/870,723

(22) Filed: Sep. 30, 2015

(65) Prior Publication Data

US 2016/0255171 A1 Sep. 1, 2016

Related U.S. Application Data

(63) Continuation of application No. 12/981,053, filed on Dec. 29, 2010, now Pat. No. 9,185,004.

(51) Int. Cl.
*H04L 29/08* (2006.01)
*H04L 12/24* (2006.01)
(Continued)

(52) U.S. Cl.
CPC ........ *H04L 67/322* (2013.01); *H04L 41/5019* (2013.01); *H04L 43/0876* (2013.01);
(Continued)

(58) Field of Classification Search
None
See application file for complete search history.

(56) References Cited

U.S. PATENT DOCUMENTS 5,208,665 A * 5/1993 McCalley ............... H04H 60/14
348/E5.008
5,987,518 A * 11/1999 Gotwald ........... H04L 29/06027
348/E5.008

(Continued)

FOREIGN PATENT DOCUMENTS

| EP | 1117214 B1 | 12/2005 |
| WO | 02102014 A3 | 2/2003 |
| WO | 2004064300 A3 | 11/2004 |

OTHER PUBLICATIONS

Extended European Search Report—EP 11195266.9—dated Jul. 5, 2012.

(Continued)

*Primary Examiner* — Angela Nguyen

(74) *Attorney, Agent, or Firm* — Banner & Witcoff, Ltd.

(57) ABSTRACT

A gateway device configured to receive IP video content may select and use transmission methods that maintain a certain quality of service for delivering the content. A transmission method may be selected based on a network to which the client device is connected. The gateway device may select a network through which the content is to be delivered depending on a variety of factors including bandwidth availability, client compatibility, quality of service provided and the like. A gateway device may further be configured to convert multicast transmissions to unicast, to provide dynamic storage of content for pre-positioning and other purposes and/or to provide other functions.

20 Claims, 9 Drawing Sheets

(51) Int. Cl.
  *H04L 12/26* (2006.01)
  *H04N 21/262* (2011.01)
  *H04N 21/643* (2011.01)
  *H04L 29/06* (2006.01)

(52) U.S. Cl.
  CPC ...... H04L 65/4076 (2013.01); H04L 65/4084 (2013.01); H04L 65/80 (2013.01); H04N 21/26216 (2013.01); H04N 21/64322 (2013.01); *H04L 41/509* (2013.01); *H04L 41/5038* (2013.01)

(56) References Cited

U.S. PATENT DOCUMENTS

| | | | |
|---|---|---|---|
| 7,039,048 B1 | 5/2006 | Monta et al. | |
| 7,522,551 B2* | 4/2009 | Giaimo | H04W 40/00 370/328 |
| 7,653,392 B2* | 1/2010 | Ovadia | H04W 28/18 370/331 |
| 8,018,934 B2* | 9/2011 | Liu | G06Q 10/087 370/390 |
| 2005/0002395 A1* | 1/2005 | Kondo | H04L 12/1836 370/390 |
| 2006/0146825 A1* | 7/2006 | Hofstaedter | H04L 45/00 370/392 |
| 2006/0209891 A1* | 9/2006 | Yamada | H04L 45/00 370/468 |
| 2006/0227766 A1 | 10/2006 | Mickle et al. | |
| 2007/0263818 A1 | 11/2007 | Sumioka et al. | |
| 2008/0002677 A1 | 1/2008 | Bugenhagen et al. | |
| 2009/0022061 A1* | 1/2009 | Walley | H04L 41/5003 370/252 |
| 2009/0300208 A1 | 12/2009 | Lepeska | |
| 2010/0146616 A1* | 6/2010 | Garrett | H04L 12/2861 726/11 |
| 2010/0197268 A1* | 8/2010 | Raleigh | H04L 12/14 455/408 |
| 2010/0287609 A1* | 11/2010 | Gonzalez | G06F 21/10 726/14 |
| 2011/0151924 A1* | 6/2011 | Miller | H04W 48/18 455/552.1 |

OTHER PUBLICATIONS

Partial European Search Report, EP 11195266.9, dated Apr. 3, 2012.
Oct. 26, 2017—Canadian Office Action—CA 2,762,683.

\* cited by examiner

QUALITY OF SERVICE FOR DISTRIBUTION OF CONTENT TO NETWORK DEVICES

RELATED APPLICATIONS

This application is a continuation application of U.S. patent application Ser. No. 12/981,053, filed Dec. 29, 2010 (now U.S. Pat. No. 9,185,004), which is incorporated herein by reference in its entirety.

TECHNICAL FIELD

Aspects of the disclosure relate to the delivery of content over a network. Specifically, aspects are directed to delivering content to Internet Protocol (IP) devices over one or more networks while maintaining quality of service.

BACKGROUND

Delivery of content over Internet Protocol (IP) via a data network, such as a wireless, optical and/or cable services network, may be expensive given the replication of content required (e.g., using data over cable service interface specification (DOCSIS)). For example, to transmit video content through traditional broadcast channels as well as video over IP channels, the video content generally needs to be replicated for each transmission method or channel (e.g., non-IP and IP). Additionally, although some current architectures are generally efficient for "bursty" voice and data, they may be relatively inefficient for "bulk" transmissions of content such as video. Video and other types of content such as audio, text, games, application, other software modules and the like may require some level of expected or guaranteed quality of service which IP transmission methods traditionally do not provide. Accordingly, IP based home networks such as home networks, may require management of quality of service when delivering video content to a client device.

BRIEF SUMMARY

The following presents a simplified summary of the disclosure in order to provide a basic understanding of some aspects. It is not intended to identify key or critical elements of the disclosure or to delineate the scope of thereof. The following summary merely presents some concepts of the disclosure in a simplified form as a prelude to the more detailed description provided below.

According to one or more aspects, IP content may be delivered to client devices through a gateway that is configured to enforce quality of service requirements and to insure compatibility. For example, the gateway may identify an appropriate network through which to deliver content and subsequently determine a transmission method to insure quality of service. The transmission method may be selected or determined based on network compatibility, client device compatibility, content type and/or combinations thereof. In one example, a service provider operated network may be configured to use time division multiple access (TDMA) while a user operated network may reserve a transmission channel or frequency band (e.g., a group of channels) specifically for a particular type of content. Accordingly, the gateway may schedule transmission of the particular type of content over either network to guarantee a certain quality of service. In one example, quality of service may include guaranteeing delivery of content to a user's device without interruption (e.g., no delay in sending subsequent video packets before the user's device is finished rendering a current portion of the video). Alternatively or additionally, quality of service may include a threshold level of delay between the user's device rendering the last available packet and receipt of a subsequent video or audio packet that may be deemed acceptable. For example, a delay of a half second may be acceptable for video delivery and rendering. In another example, gaming data (e.g., on-line games) may be delivered within a threshold level of delay to prevent excess lag in the game.

According to another aspect, a gateway device may determine whether the received content corresponds to IP data. If so, the gateway device may deliver the data to the client device in the IP format. If, however, the gateway device determines that the content is received in another format, e.g., an MPEG transport stream (TS), the gateway device may re-encapsulate the data into IP data packets and frames, remove MPEG header information and insert IP header information. This may insure that IP compatible devices that are not necessarily compatible with other transport formats are able to render or otherwise use the received content.

According to yet another aspect, content may be delivered from a content provider to a client device through a provider network that includes multiple channels. Some channels may be dedicated to particular types of content while others may be unreserved or free for use by all types of content. Channels may also be reserved based on priority. Accordingly, content having a certain level of priority may be allowed to use certain channels in the network while other types of content are not. Additionally or alternatively, data may be transmitted from the client device or client network to a provider using similar priority considerations. For example, content requests for a first type of content may be given higher priority (and thus allowed to use certain channels) while other data transmissions may be assigned a lower priority.

According to another aspect, a gateway device may be configured to select a network from a plurality of networks through which to deliver content to a client device. The selection of the network may be made based on available bandwidth in each of the networks, whether the network provides guaranteed quality of service, a current backlog in transmission queues for each of the networks and the like. For example, the gateway device may choose to transmit content through a service provider operated network by default (if multiple networks have available bandwidth) since the service provider operated network is configured to guarantee a threshold quality of service.

According to another aspect, multicast transmissions may be converted into unicast format if a client device or network is incompatible with multicast. Thus, in one example, the gateway device may re-packetize a multicast packet (e.g., UDP packet) into a unicast packet (e.g., TCP packet) prior to transmitting the data to the intended recipient device.

According to yet another aspect, content may be queued and scheduled for transmission based on a priority level. The priority level may be determined based on content type (e.g., video, images, games, software modules, applications, website content, text, application data, etc.) and may allow some content types, such as video, to be transmitted prior to others regardless of an amount of time queued.

According to another aspect, the gateway may be configured to operate according to different distribution and resource reservation control schemes based on defined triggers. For example, a user may specify that between the hours of 8 AM and 5 PM, the gateway should use a best quality of service type scheme where video is delivered over a network that is able to guarantee the highest quality of service. After 5 PM, however, the user may specify that the gateway should use only network A (e.g., if there are two networks, A and B, in the user's location).

In other embodiments, aspects of the present disclosure can be partially or wholly implemented on a computer-readable medium, for example, by storing computer-executable instructions or modules, or by utilizing computer-readable data structures.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
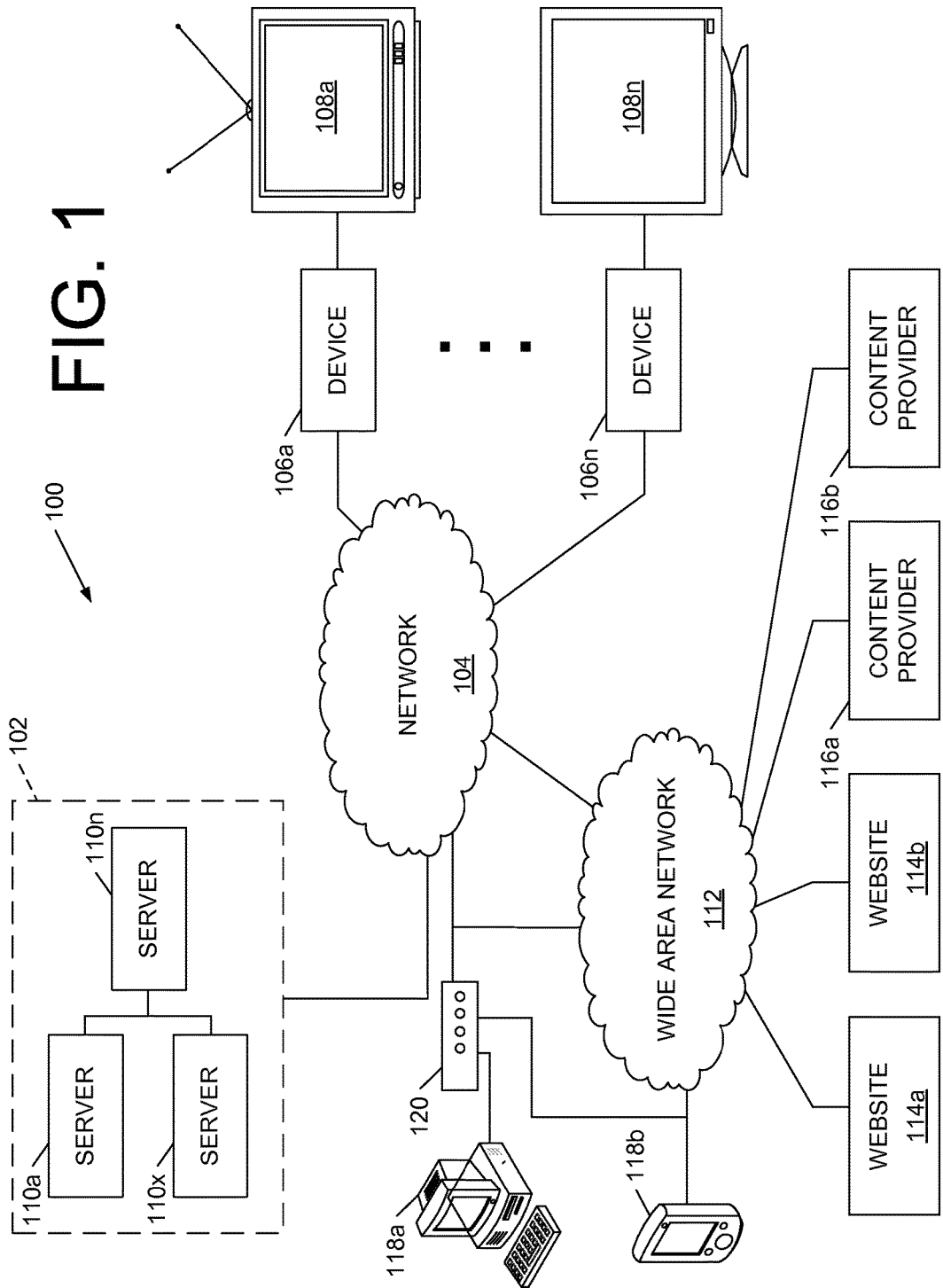
FIG. 1 illustrates an example network environment in which content items may be distributed to clients.

FIG. 1 illustrates a content distribution system 100 that may be used in connection with one or more aspects described herein. The distribution system 100 may include a central office 102 (e.g., any server, computer, source, head-end, etc.), a network 104, consumer devices (e.g., personal computers, set-top boxes, gateways, satellite receivers, fiber optic interface units, etc.) 106 and corresponding display/consumption devices 108 (e.g., televisions, computer displays, etc., which may be integrated with or separate from the computing devices 106). Devices 106 may include computing devices that are configured to receive content through a dedicated content distribution network such as a cable network, fiber optic network, wireless or satellite network and the like. Devices 106 may include connections for outputting video, images, audio, data and the like to a display device such as television 108a. The distribution system 100 may be used as a media service provider system wherein the provider (or vendor) generally operates the central office 102 and the network 104, and in some situations may also provide a user (e.g., subscriber, client, customer, service purchaser, user, etc.) with the device 106. Network 104 may include a physical cable network such as a hybrid fiber-optic coax network that is dedicated to the distribution of content and data for a particular service provider. For example, network 104 might not be accessible to users who do not registered for one or more services provided by the service provider. Network 104 may include other types of physical transmission channels such as fiber optic wires, wireless networks, Ethernet cables and the like.

The device 106 is generally located at the user or client location such as an individual's home, a tavern, a hotel room, a business, etc., and the display device 108 is generally provided by the client. The display/consumption device 108 may include a television, high definition television (HDTV), monitor, host viewing device, MP3 player, audio receiver, radio, communication device, personal computer, media player, digital video recorder, game playing device, etc. The device 108 may be implemented as a transceiver having interactive capability in connection with the device 106, the central office 102 or both.

The central office 102 may include a plurality of devices 110 (e.g., devices 110a-110n) such as data servers, computers, processors, security encryption and decryption apparatuses or systems, and the like configured to provide video and audio data (e.g., movies, music, television programming, games, and the like), processing equipment (e.g., provider operated account processing servers), television service transceivers (e.g., transceivers for standard broadcast television and radio, digital television, HDTV, audio, MP3, text messaging, gaming, etc.), and the like. At least one of the devices 110 (e.g., a sender security device 110x), may include a security system.

In one or more embodiments, network 104 may further provide access to a wide area network (WAN) 112 such as the Internet through which devices not connected to the media distribution network 104 may communicate with devices connected to network 104. Accordingly, device 106 or central office 102 may have access to content and data on the wide area network 112. Content items may include data, applications, audio, video, text and/or combinations thereof. In one example, a service provider may allow a user to access websites 114 and content providers 116 connected to the WAN 112 (e.g., Internet) using the device 106. Websites 114 may include news sites, social networking sites, personal webpages and the like. In another example, a service provider (e.g., a media provider) may supplement or customize media data sent to a user's device 106 or other content receiving device using data from the WAN 112. Alternatively or additionally, one or more other computing devices 118 may be used to access either network 104 or wide area network 112. To access the WAN, a user may be provided with a modem 120 (e.g., a coaxial cable modem, an optical cable modem, etc.) that is configured to process data carried through, for example, radio frequency (RF) channels.

Data communications may be formatted and transmitted through a network in accordance with standards such as, in an example of an HFC network, data over cable service interface specification (DOCSIS). For example, data communications may be formatted into one or more IP packets at central office 102. The IP packets may then be transported to the client using an MPEG transport stream. Accordingly, in some arrangements, video may be delivered over IP to client devices such as set-top boxes, media servers, personal computers and the like, rather than through traditional television broadcast transmission streams such as MPEG transport streams.

According to one or more aspects, modem 120 and device 106 may be referred to as client or subscriber devices because they provide users with access to services and content provided by central office 102. Without devices 120 and 106, a user might not be able to access the services or content. Each user or account serviced by central office 102 may be provided with one or more devices (e.g., one device 106 per television or other display device in a home). Alternatively or additionally, a single modem 120 may be used to provide wide area network access to a plurality of computing devices 118.

Figure 2:
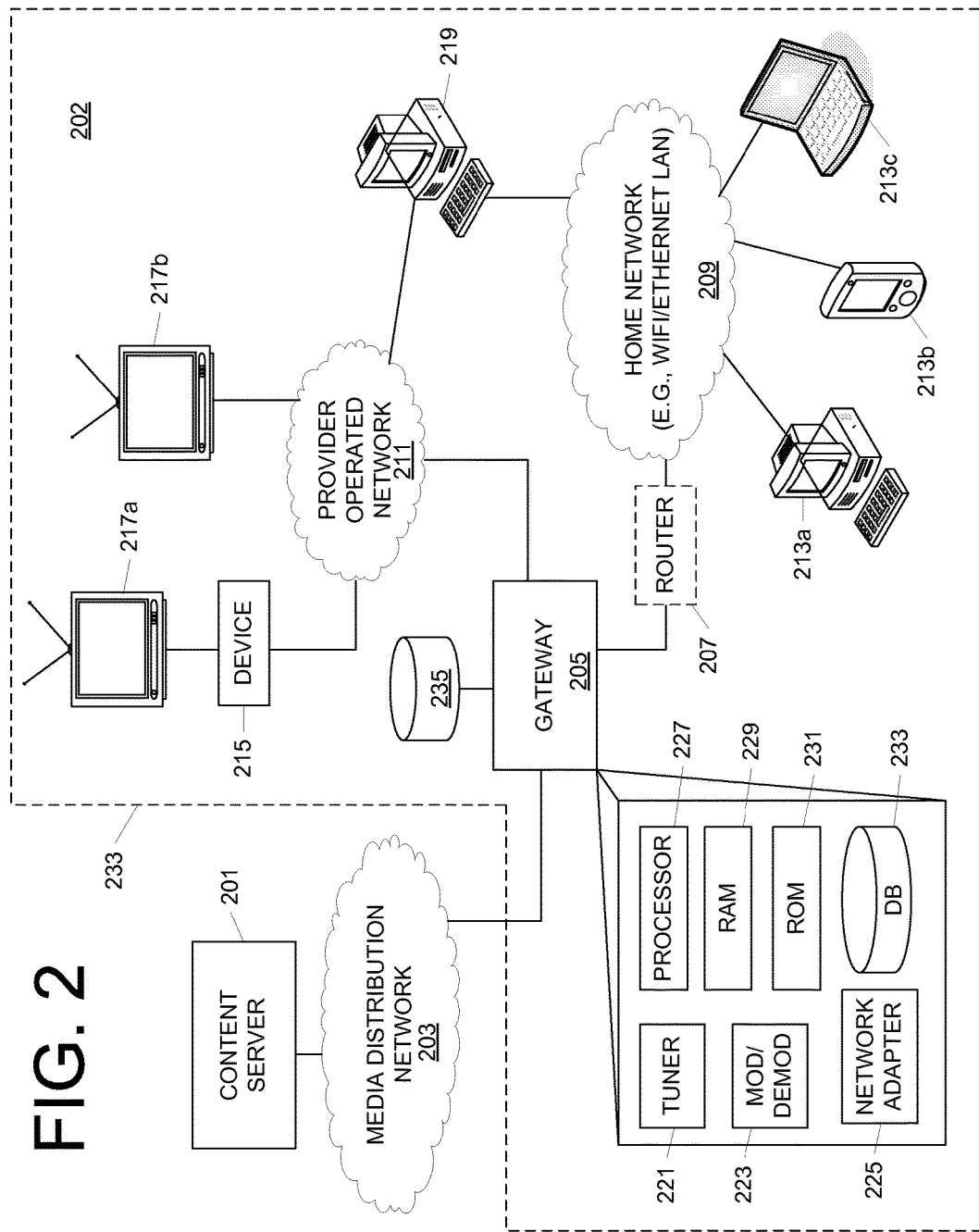
FIG. 2 illustrates another example network environment in which a gateway device may coordinate content delivery in multiple home networks according to one or more aspects described herein.

FIG. 2 is a block diagram illustrating an example content delivery network in which gateway 205 controls the distribution of data including IP video content from content server 201 to clients 213, 215, 217 and 219 over multiple physical or logical service provider networks 211, such as multiple service provider (MSO) operated networks and/or a user operated network 209 such as a home network within a user's home (e.g., as illustrated by outline 233). In one example, a provider network 211 may include a physical coaxial or fiber-optic network (e.g., a MoCA (Multimedia over Coax Alliance) network) or a wireless network in a user's home 202 and be established between service provider configured devices 215, 217 and/or 219 may be connected. Gateway 205 may, in one or more arrangements, store content items including video, audio, text, images and other forms of content in an internal or external storage 235. In one example, content may be pre-positioned (e.g., pre-stored, cached, buffered) in storage 235 before delivery to client devices. In some arrangements, content may be pre-positioned prior to receiving a request for the content from a user or client device. For instance, a gateway device such as gateway 205 may pre-position content such as code images, digital rights management keys, advertisements, other video and/or audio content and the like. Service provider configured devices 215, 217 and/or 219 may be configured with common communication protocols used by the service provider to insure quality of service, such as time division multiple access (TDMA). By configuring device 215 to expect transmissions using TDMA and to be able to process such communication schemes, the service provider may insure that content is delivered with a certain quality of service to consumption devices such as displays 217 over network 211.

A user operated network 209, on the other hand, may include a network that is established between devices that are not configured or provided by the service provider. Accordingly, there is no guarantee that the devices on user network 209 will be configured to enforce a particular resource reservation control schemes. For example, customer network 209 may include a wireless or Ethernet network employing a user provided and configured router 207 that uses best effort delivery transmission methods. Accordingly, in one or more arrangements, gateway 205 may be used to provide quality of service to clients 213 in a transparent manner. That is, clients 213 might not need to have specific programming or hardware to accept quality of service controlled data transmissions. In one example, one or more channels or bands within a wireless customer network may be reserved by gateway 205 for transmission of IP video. Such a channel, e.g., bandwidth, reservation scheme allows the gateway 205 to offer quality of service to clients 213 without requiring clients 213 to have or acquire specific software, hardware or firmware for processing transmission protocols other than IP, for example. User operated network 209 may further be user configurable to modify the quality of service control criteria and schemes implemented or enforced by gateway 205. For example, a user may configure the user network 209 such that resource reservation controls (e.g., bandwidth reservation controls) are not used between the hours of 5 PM and 9 PM. In contrast, resource reservation controls for service provider networks such as provider network 211 might not be user configurable if, for example, the service provider wishes to guarantee quality of service over network 211 under its own terms and conditions.

Gateway 205 may be configured to receive television programming, on-demand video and other content or data from content server 201 through a media distribution network 203, such as hybrid fiber-optic coaxial (HFC) network that may extend between a service provider's location and a user's home 202. Data streams from a provider may comprise, for example, one or more DOCSIS channels carrying IP video content in the context of an HFC network. Gateway 205 may reside in a user's home 202 and be configured to determine a source and destination for the received content and further to route the content to an appropriate home device (e.g., one of clients 213, 215, 219). Such gateways may also be used in other user locations such as offices, hotels, stores, restaurants and the like.

In one or more arrangements, gateway 205 may be configured to select a network through which received content should be sent to a device to maintain or guarantee quality of service, timely delivery and the like. For example, device 219 may include a computing device that includes a connector and tuner for receiving data over networks such as provider network 211 as well as an Ethernet network adapter for receiving data over wireless or wired Ethernet networks (e.g., network 209). Accordingly, device 219 may receive and transmit data over either network 209 or 211 or both depending on user preference, bandwidth availability, type of content, user preferences, service provider settings and/or combinations thereof. Gateway 205 may thus select one of networks 209 and 211 to use based on considerations such as available bandwidth in each network, priority or importance of the data to be sent, type of data being sent and the like. Once a network has been selected, gateway 205 may transmit the content to device 219 through the selected network.

Gateway 205 may further be configured to prioritize content transmissions. For example, IP video content may be prioritized over non-time sensitive data such as data for web pages, emails, short message service (SMS) messages, etc. Priority may be determined based on one or more considerations including importance of timely delivery for user experience, importance of all data being received correctly by intended recipient, time in queue and the like.

Gateway 205 may include a variety of components including a processor 227, RAM 229, ROM 231, database 233, a tuner 221, modulator/demodulator 223 and a network adapter 225. Tuner 221 may be configured to separate out channels of data such as data channels and television programming channels from a radio frequency (RF) signal. Modem 223 may be configured to further decode data received over the various channels in the RF signal into a compatible form (e.g., analog to digital or vice versa). Network adapter 225 may be used to communicate with devices over one or more local area networks (LANs) such as networks 209 and 211. Random access memory (RAM)

229 and read-only memory (ROM) 231 may be configured to store instructions and information that requires fast access while processor 227 may be configured to execute instructions stored in RAM 229 and to perform various calculations. Storage 233, on the other hand, may be configured to store a variety of information including configuration settings, device identification information, bandwidth allocation algorithms and the like. For example, gateway 205 may store rules (e.g., criteria and actions) in database 233 for selecting a network through which to send IP video content.

Figure 3:
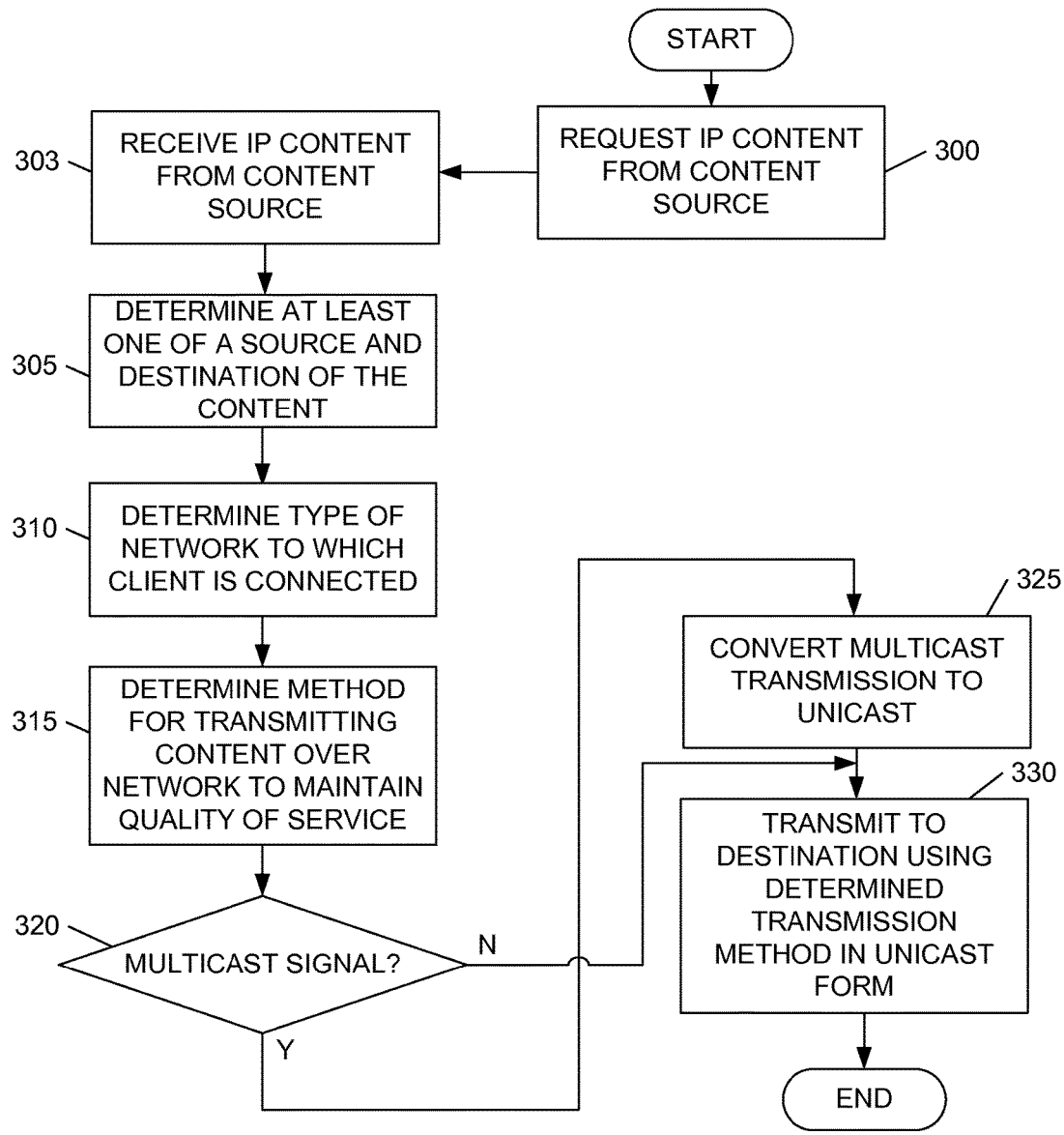
FIG. 3 is a flowchart illustrating an example method for processing and delivering IP video content to one or more client devices according to one or more aspects described herein.

FIG. 3 illustrates an example method by which a gateway such as gateway 205 (FIG. 2) may receive content from a content source and distribute the content to an appropriate network and client. In step 300, a gateway may request IP content from a service or content provider on behalf of a user (e.g., if a user orders video-on-demand content). In step 303, the gateway or another device may receive the IP content from a service or content provider in response to the request. In step 305, the gateway may identify a source and/or destination of the content. The source and intended destination of the content may be specified in packet headers of packets carried in the content signal. In one or more arrangements, gateway may record or store source and destination pairs in a look-up table so that a destination may be determined based on the source of the content (e.g., without identifying the destination from the content signal itself). In step 310, the gateway may determine a network type of the network to which the destination client is connected. For example, the gateway may determine if the client is connected to the provider operated network or a user operated network. This determination may be made based on registration information received and stored at the gateway. For example, when a client connects to a either the provider operated network or the user operated network, the gateway may register the client device within a device registry or database by recording a MAC address, an IP address, device name and/or combinations thereof. Additionally or alternatively, registration may include the recordation of protocols with which the client device is compatible as well as networks to which the device is connected.

In step 315, the gateway may determine a transmission method for delivering the content while maintaining quality of service over the network to which the client device is connected. In one example, clients in an provider operated network may all be configured by the service provider to be compatible with one or more transmission protocols, such as TDMA. Accordingly, if a destination client is resident on the provider operated network, the gateway may select TDMA as the transmission method. Alternatively, if the destination client is on a user operated network where devices might not be guaranteed to be compatible with a transmission protocol that guarantees quality of service, the gateway may configure dedicated channels (e.g., physical channels) to provide reservation control in delivering content to a destination device. Reservation control allows a network or control system thereof to reserve bandwidth and other network resources for various types of devices, content, users, service providers and the like. By using dedicated channels, and in some examples, dedicated physical channels, the client device might not need to reconfigure its operation. Rather, the client may receive data over the wired or wireless channels in normal fashion. The resource reservation controls are thus provided transparently to the client. In contrast, clients such as device 215 of FIG. 2 (e.g., which may be a set-top box) of a MSO operated network might need to understand TDMA transmission protocol, or another protocol, to correctly receive and process data according to the TDMA resource reservation control scheme.

Once an appropriate transmission method has been determined and selected, the gateway may determine whether the signal received from the content provider or media distribution network is in a multicast format by examining the destination address in step 320. For example, if the destination address corresponds to a multicast group address, the gateway may classify the signal as a multicast signal. Multicast group addresses are generally publicized throughout the network and client devices may elect to join the multicast group to receive subsequent communications. If the signal is not a multicast signal, the gateway may forward the data to a destination device in unicast format using the determined transmission method in step 330.

If, however, the signal is a multicast signal, the gateway may perform a multicast to unicast conversion in step 325. In one example, this conversion process may include the re-packetization of the transmitted data from UDP to TCP packets. The data may then be sent to the destination client in unicast form as illustrated in step 330.

According to one or more aspects, quality of service and timely delivery may be considered more critical for video content (e.g., streaming video) than other types of data such as web page text or images, file downloads, application data and the like. Thus, a gateway such as gateway 205 of FIG. 2 may prioritize data transmissions to insure that quality of service is maintained for video content.

Figure 4:
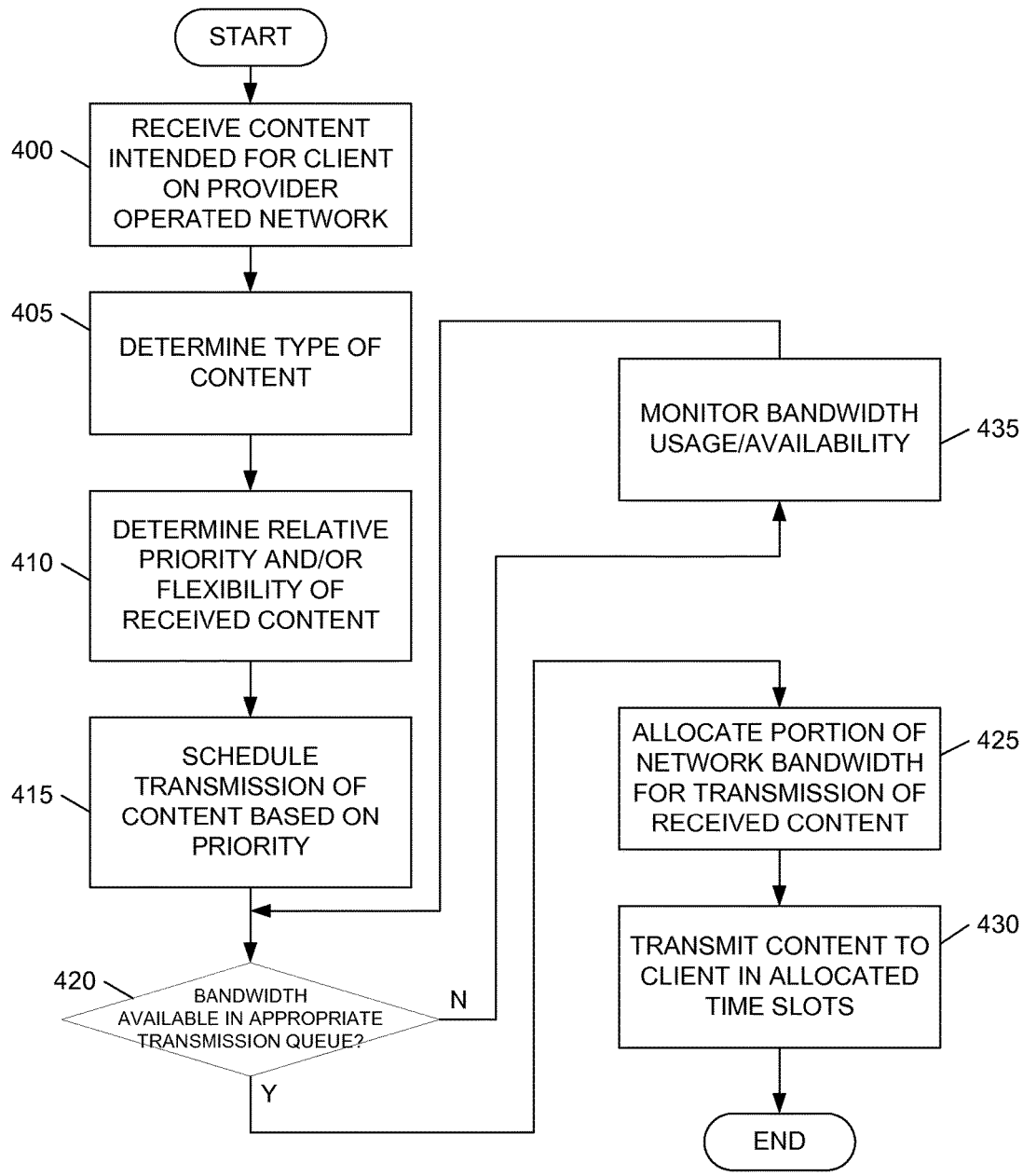
FIG. 4 is a flowchart illustrating a method by which video content may be transmitted over a service provider operated network according to one or more aspects described herein.

FIG. 4 illustrates a method by which a gateway such as gateway 205 (FIG. 2) may prioritize video content transmission over other data types to insure quality of service in a provider operated network. In step 400, the gateway may receive content intended for a client on provider operated network. The gateway may subsequently determine the type of content received in step 405. In one or more examples, the content type may be determined based on a packet header of the data. That is, the packet header may include a parameter identifying the type or format of information carried in the payload. In step 410, the gateway may determine a relative priority and/or flexibility of the received content. As noted, video content may be given highest priority versus other types of content that may be awaiting transfer to destination clients. Additionally, two competing video streams may be prioritized based on an amount of time queued, bandwidth requirements, amount of video buffered by client, amount of video already transmitted to client and/or combinations thereof. Flexibility of the receive content may include a tolerance for delay for the content or type of content. For example, some types of content may be more susceptible to delays (e.g., more noticeable in video or games) while delays in other types of content might not be as noticeable or bothersome (e.g., webpage data). Accordingly, webpages and other types of content for which timing is less detrimental may have a higher level of flexibility than other types of content such as video, audio and/or games.

In step 415, the gateway may subsequently schedule transmission of the content, such as video content, based on the prioritization in step 410. Scheduling transmission may include queuing the content based on the level of priority. In step 420, the gateway may determine whether bandwidth is available. If so, the gateway may allocate a time slot in the bandwidth for the next content in the queue in step 425. In one example, a TDMA transmission scheme may divide the bandwidth into multiple time slots (e.g., 20 slots per millisecond, 10 slots per millisecond, 5 slots per millisecond). Thus, a number of data streams equal to the number of slots may be transmitted simultaneously using reserved bandwidth. Clients may be configured to receive data in their allocated slot while disregarding the data carried in the other time slots if the data is not relevant or intended to the client. In step 430, the gateway may transmit the content in the allotted time slot. If bandwidth is not available, however, the gateway may monitor bandwidth usage and availability in step 435.

Figure 5:
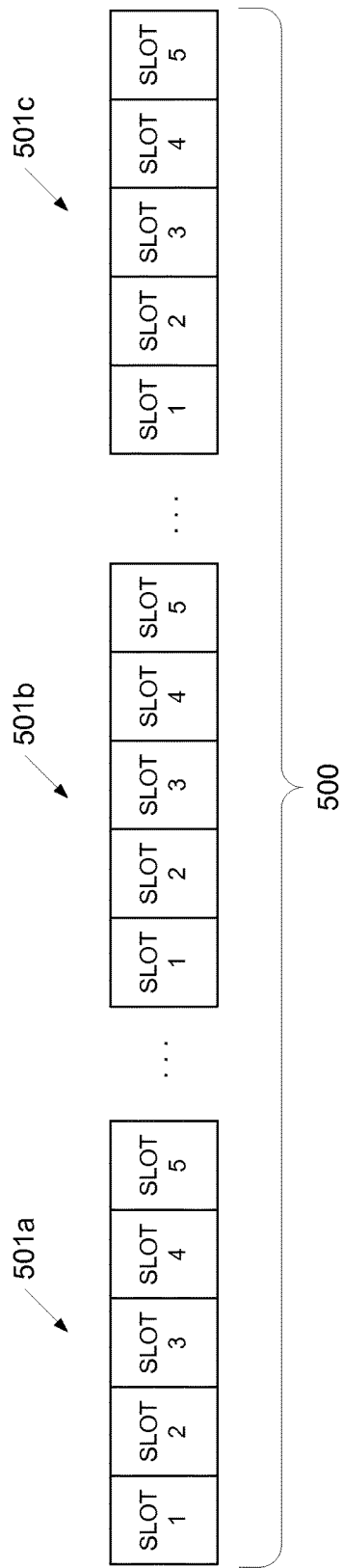
FIG. 5 illustrates an example transmission stream formatted according to a time division multiple access protocol according to one or more aspects described herein.

FIG. 5 illustrates an example portion of a transmission stream configured to carry service data according to a TDMA scheme. In particular, transmission stream 500 includes five repeating slots 501*a*, 501*b* and 501*c* for delivery of various services (e.g., programming services, individual content items, applications, etc.). Each of slots 501*a*, 501*b* and 501*c* may be used to deliver a single service (e.g., an item of content, a channel of programming, an application, a game, etc.). This scheme allows services to share the transmission stream 500 without contending for the same portion of bandwidth. Receivers or client devices may be configured to receive service data based on a published schedule of services available in transmission stream 500. In one or more examples, the service schedule may comprise program specific information/service information (PSI/SI) carried in a packet header (not shown) transmitted with every repeating cycle of slots 501*a*, 501*b* and 501*c*. Accordingly, receivers may tune to transmission stream 500 at predefined times corresponding to desired services.

Figure 6:
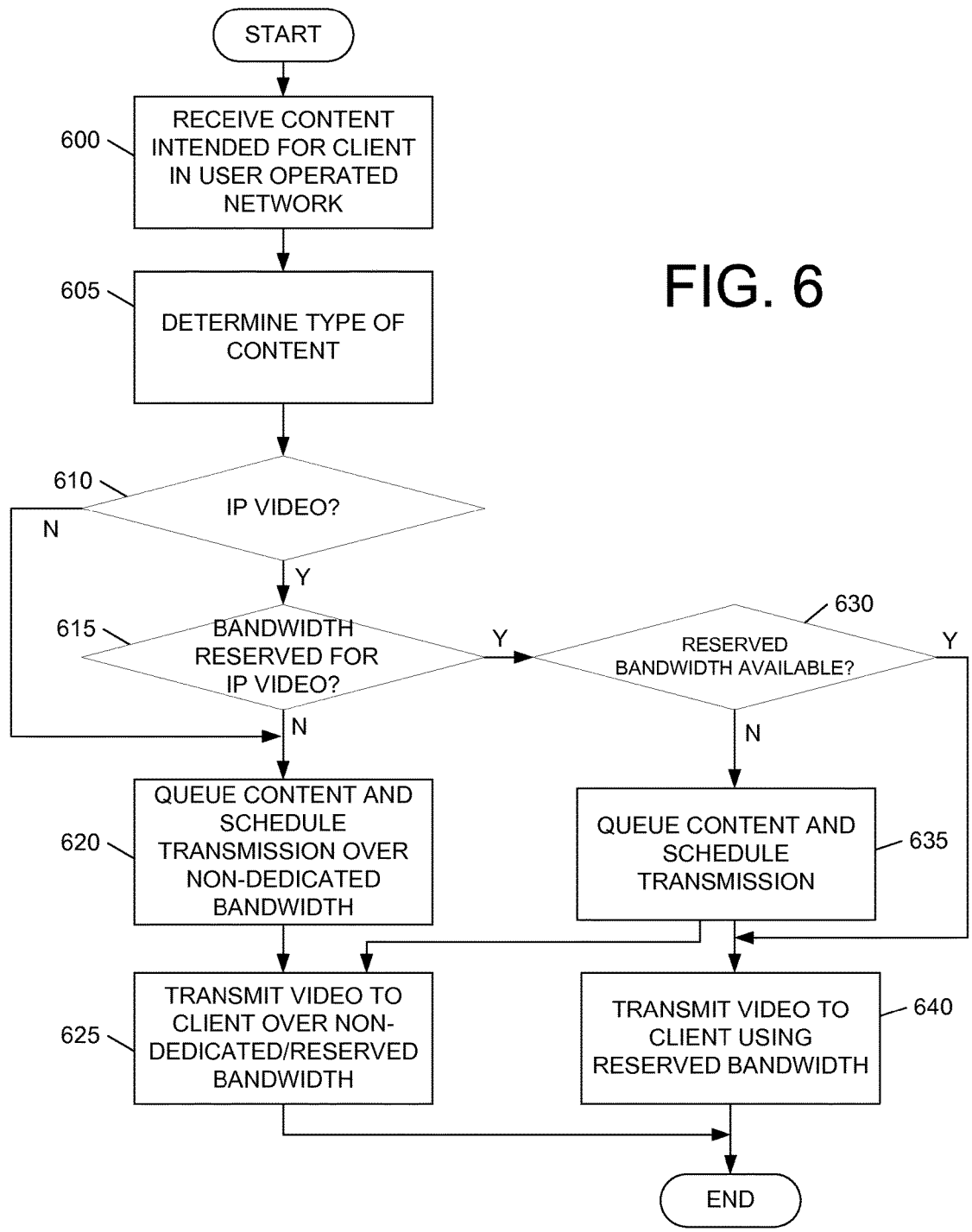
FIG. 6 is a flowchart illustrating a method for transmitting video content through a user operated or home network according to one or more aspects described herein.

FIG. 6 illustrates a method by which content may be delivered over a user operated network while maintaining quality of service. In step 600, the gateway device may receive content from a service provider through a network. In step 605, the gateway device may determine a type of content received. If the content comprises IP video, as determined in steps 605 and 610, the gateway may subsequently determine whether bandwidth has been reserved within the user operated network for the content (e.g., video) in step 615. Such a determination may be made based on network configuration information of the user operated network stored at the gateway. For example, the configuration information may include identification of reserved and unreserved portions of bandwidth available in the network, permissible transmissions for each of the bandwidth portions and/or client information including client's ability to receive data over each of the portions of bandwidth.

If a bandwidth is reserved for and/or dedicated to video content, the gateway may subsequently determine whether the reserved bandwidth is currently available (e.g., free or unused) in step 630. If the bandwidth is available, the gateway may transmit the video content to a destination client device over the reserved bandwidth in step 640. In one or more arrangements, the gateway may notify the recipient client device of the channel over which the video content is to be delivered to allow the client device time to reconfigure network settings if necessary.

If, however, the reserved bandwidth is not available (step 630), the gateway may instead queue the content and schedule transmission in step 635. The scheduling may include prioritization of video content over types of content. Additionally or alternatively, the queuing and scheduling mechanism may indicate that the content comprises video content and may deliver the content over the dedicated bandwidth or using other bandwidth of the network. Accordingly, in one example, if unreserved/non-dedicated bandwidth is or becomes available before bandwidth becomes reserved bandwidth is available, the gateway may choose to transmit the video content using non-dedicated bandwidth for more timely delivery in step 625. If, on the other hand, reserved bandwidth becomes available first or the amount of unreserved bandwidth available is insufficient, the gateway may choose to transmit the video content using the reserved bandwidth in step 640. If both reserved and unreserved bandwidth are available, the gateway may choose the dedicated bandwidth by default (step 640).

If the content does not correspond to video content (step 610) or bandwidth is not allocated specifically for video content (step 615), the gateway may queue the content and schedule transmission using unreserved bandwidth in step 620. If and when unreserved bandwidth becomes available, the received content may be delivered to the intended recipient device based on the established schedule and queue in step 625. In one or more arrangements, transmissions using unreserved bandwidth may be performed using a best effort delivery which may include unspecified variable bit rate and delivery time, depending on the current traffic load. Best effort delivery might not include features such as recovery of lost or corrupted data and pre-allocation of resources in exchange for greater network efficiency.

The method described with respect to FIG. 6 may be used for other types of content. For example, audio content may be treated in a similar manner with reserved bandwidth dedicated to its transmission. In another example, bandwidth may be reserved for gaming data or software modules. Additionally or alternatively, if reserved bandwidth for a first type of content is not being used and reserved bandwidth for a second type of content is being used, received content of the second type may be allowed to use the reserved bandwidth for the first type to insure quality of service.

Figure 7:
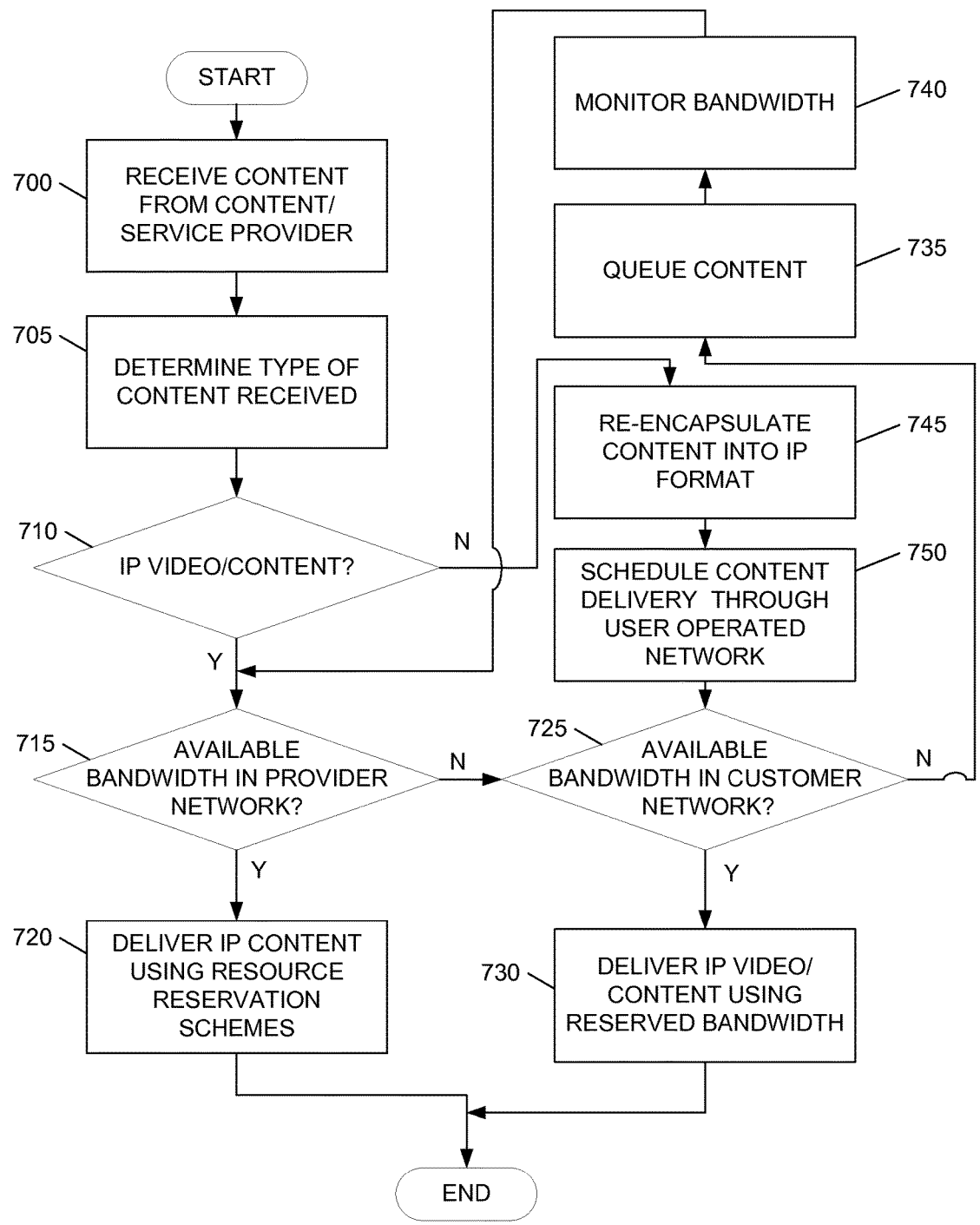
FIG. 7 is a flowchart illustrating a method for selecting a network through which video content is delivered to a client device according to one or more aspects described herein.

According to one or more configurations, a client device may include connections to both a provider operated network as well as a user operated network. Accordingly, a gateway may choose a network for delivery of content based on a variety of considerations including a quality of service level, available bandwidth and timely delivery. FIG. 7 illustrates a method by which a gateway may select a network through which to send data or content such as IP video content, gaming data, audio, etc. In step 700, a gateway device may receive content from a service or content provider. In step 705, the gateway may determine the type of content received. In step 710, the gateway may further determine whether the determined type of content corresponds to IP video content or IP content in general (versus content carried in MPEG transport stream format). Again, packet headers may be examined to determine the type and format of the data stored in the payload. Other content type determination mechanisms and methods may also be used.

If the content is determined to correspond to IP video content, the gateway may determine whether bandwidth is available in a provider operated network in step 715. The gateway may seek bandwidth in the provider operated network first as a default since the provider operated network may have a higher guaranteed quality of service due to the devices and network being configured and managed by the service provider. If bandwidth is available over the provider operated network, the gateway may schedule transmission of the IP video content to a recipient device using various transmission schemes in step 720.

If, however, bandwidth is unavailable over the provider operated network, the gateway may determine whether bandwidth is available over the user operated network in step 725. If bandwidth is available in the customer operated network, the gateway may deliver the IP video content to the recipient device there through in step 730. In one or more arrangements, the gateway may deliver the content using dedicated network channels of the user operated network.

If bandwidth is not available in either the provider network or the customer network, the gateway may queue the IP video content for future delivery in step 735. Furthermore, the gateway may monitor bandwidth usage and availability in step 740 to detect new bandwidth availability in the provider network and/or the user operated network. Queuing may include prioritization of the IP video content over other types of queued content. Accordingly, even if web page text has been queued for a longer period of time, the IP video content may be delivered first using the next available portion of bandwidth due to its higher priority. In some arrangements, if the video content or other type of content is received in IP format, the gateway may further determine if the content is in multicast format. If so, the gateway may convert the content into unicast format for transmission to a recipient client device. If, on the other hand, the video content does not correspond to IP data, the content may re-encapsulated into IP format in step 745. For example, if the content is MPEG-TS based video content, the gateway may remove MPEG header information from the MPEG transport stream and re-encapsulate the data as IP packets and frames having IP header information. The converted content may then delivered through the user operated network in step 750. In one or more examples, if the user operated network includes both dedicated IP video and non-dedicated bandwidth, the gateway may deliver the non-IP video content using the non-dedicated bandwidth. Conversion to IP format may be performed for any non-IP content. Resource reservation and distribution schemes as described herein may apply to any type of content depending on a requisite level of quality of service. The process may then proceed to step 725 as described above.

While TDMA and dedicated network channels have been described herein for maintaining or guaranteeing quality of service, other transmission and network schemes may be used to provide quality of service over both user operated networks and provider operated networks. For example, in Wi-Fi customer networks, a band may be dedicated for transmission of IP video content. In particular, a network router and a client device may each be capable of transmitting and receiving data over multiple bands (e.g., 2.4 Ghz, 900 MHz, 5 GhHz). One or more of these bands may be reserved as a dedicated IP video transmission band while the others are provided for general use.

Figure 8:
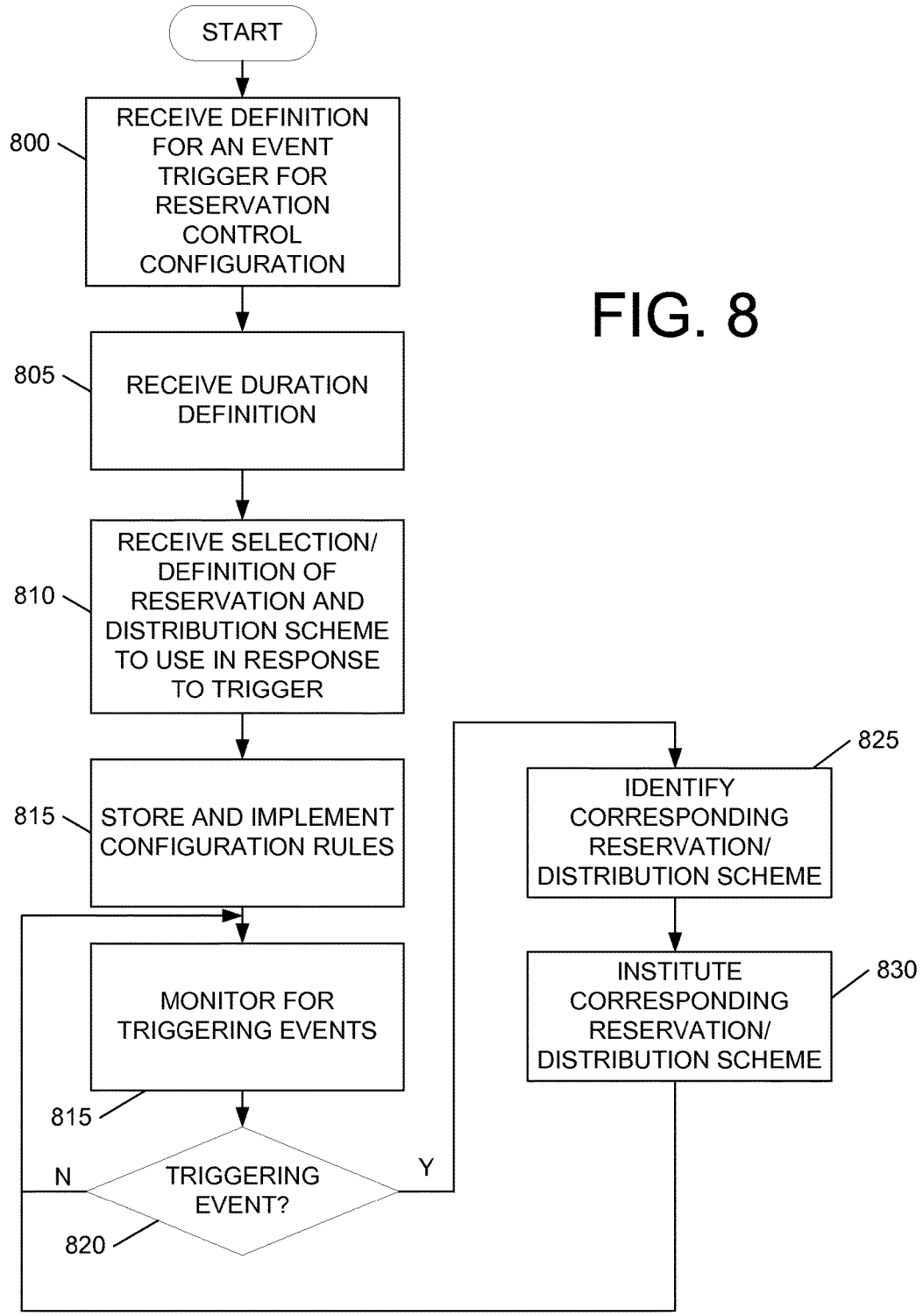
FIG. 8 is a flowchart illustrating a method for configuring a gateway to operate under different resource reservation and distribution schemes in response to detecting various triggers according to one or more aspects described herein.

FIG. 8 illustrates a method by which a user may customize the manner in which a gateway delivers content to various devices. Thus, a user may specify reservation control schemes to use for each of multiple networks for a given period of time. For example, in a home or other user location, two networks may exist. In such an environment, the user may configure the gateway to only use a first network for delivering video content between the hours of 6 PM and midnight if, for example, data traffic is higher due to web surfing, Internet gaming and the like over the second network. In another example, the user may configure the gateway to use a predefined amount of bandwidth for video delivery in a data network to prevent noticeable slowdown or other effects on other types of data transmissions.

In step 800, the gateway may receive information defining an event that is to trigger a change or institution of a particular reservation control scheme and/or distribution scheme. The information may include a time of day, a particular traffic level (e.g., if traffic on network 1 is above 15 Mbps), a number of users connected to the network, types of data being transmitted, applications using the network and the like. In one example, the user may set a triggering event as the network traffic being greater than 2 Mbps and more than 2 devices connected to the network. In step 805, the gateway may subsequently receive duration definition information. The duration may be unspecified if the user wants a scheme to persist until another event trigger is detected. Alternatively, the user may define the duration to be a specified amount of time, upon expiration of which, the scheme may revert back to a default reservation and distribution configuration. Once the duration of the triggered configuration has been defined, the gateway may then receive a selection of a configuration to use in response to detecting the triggering event in step 810. The selection of the configuration may include a manual selection of various parameters to use (e.g., an amount of bandwidth to dedicate to IP video over each of two networks, setting a preference for one network over another). Alternatively, the user may select a pre-defined configuration to automatically define a plurality of parameters. Once the configuration has been finalized, the gateway may store and implement the configuration rules in step 815.

In step 820, the gateway may operate to detect whether any of the defined events have been triggered. If so, the gateway may identify the corresponding reservation and distribution scheme for that trigger and apply the parameters and rules defined therein in step 825. For example, the gateway may use a look-up table to identify the resource reservation and distribution scheme parameters corresponding to the detected event. In step 830, the gateway may then institute the identified reservation and distribution scheme. In one example, the gateway may detect that the time is now 8:00 PM and that an event has been defined for 8:00 PM. In response, the gateway may apply bandwidth restrictions for transmitting video over a first network and set a preference for delivering video over a second network. In either case, the gateway may return to monitoring for defined events in step 820.

Figure 9:
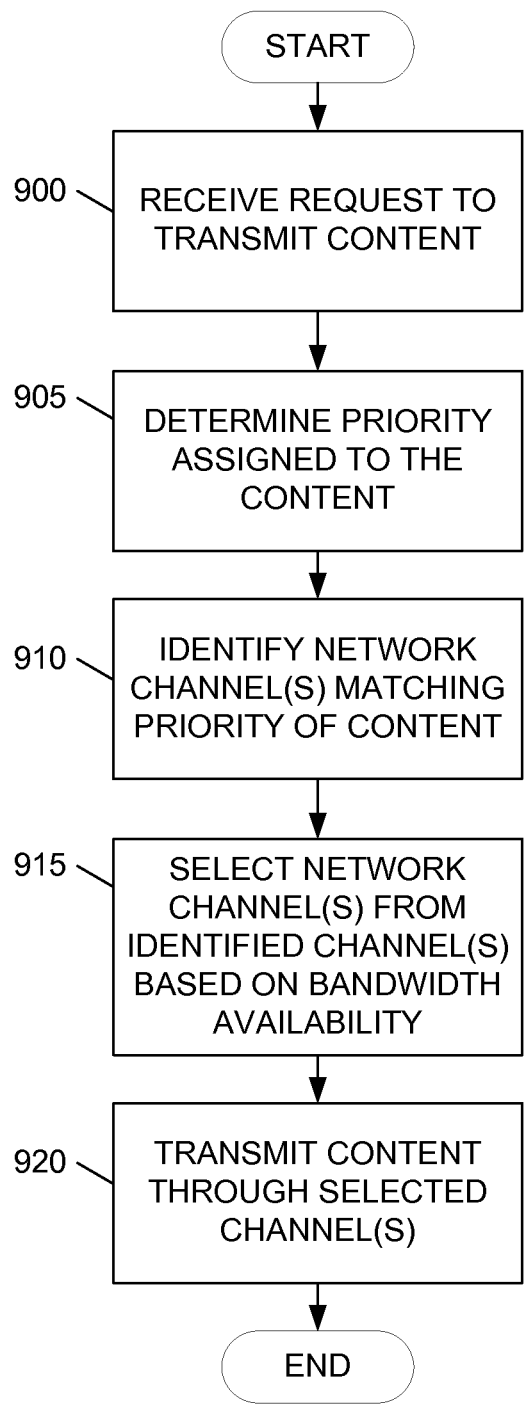
FIG. 9 is a flowchart illustrating a method for transmitting data over a network between a content provider and a client device according to one or more aspects described herein.

FIG. 9 illustrates a method for selecting a channel through which to send content or other types of data through a network situated between a service or content provider and a client device. In step 900, a system such as a content provider or a gateway may receive a request to transmit content. For example, the request may be received by a content provider from a user device. In another example, the request may be received by the gateway from a user device or a content provider. In step 905, the system may determine a priority assigned to or otherwise associated with the content or data to be transmitted. Priority may be explicitly assigned, e.g., stored as metadata of the content item or may be defined based on content type (e.g., in a look-up table). In other examples, priority may be associated with a recipient or sender of the content. In step 910, the system may further identify one or more channels of the network through which transmission of the content is allowed based on priority. In one example, multiple channels may be reserved for video content. However, the multiple channels may correspond to multiple different priority levels. Accordingly, the channel or channels selected for transmission of the video content may be determined by matching the priority level of the video content with a priority level of the multiple channels. In another example, audio content may be assigned a priority level while each of multiple network channels may correspond a threshold priority level. The priority level of the audio content may then be compared to each of the threshold priority levels of the multiple channels.

The audio content may then be allowed to use any of the channels having a threshold priority level lower than or equal to the priority level of the audio content.

In step 915, the system may select one or more of the identified channel(s) to use for transmission of the content based on bandwidth availability. For example, the system may determine an amount of bandwidth needed for transmission of the content. The system may then compare the amount of bandwidth needed with an amount of bandwidth available in each of the identified channel(s). In some arrangements, multiple channels may be selected if the combined bandwidth meets the bandwidth requirements for transmitting the content. In some arrangements, the type of content might also be taken into account in selecting one or more transmission channels. For example, channels may be reserved for transmitting a certain type or types of content. Accordingly, even if bandwidth is available and a priority level is satisfied, a channel might not be selected based on content type reservations. Once one or more channels have been selected, the system may transmit the content over the selected channels in step 920.

According to one or more aspects, transmissions from a content provider or service provider may be performed using downstream channels or links while data from the gateway device or client devices to the content or service provider is performed using upstream channels. Downstream and upstream channels may be distinct from one another and reserved for the respective directional transmissions. In other arrangements, downstream and upstream channels may be used interchangeably; however, the channels might only be used in one direction at any given time.

Aspects described herein may be used for other types of access networks including fiber optic network such as passive optical networks (PONs).

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

What is claimed is:

1. A method comprising:
   receiving, by a computing device, a content item;
   determining, by the computing device, that the content item has a first media content type; and
   in response to determining that a first network has insufficient available bandwidth to transfer the content item,
      determining whether a first bandwidth, of a second network and prioritized for transmitting media having the first media content type, has sufficient available bandwidth to transfer the content item;
      in response to determining that the first bandwidth has insufficient available bandwidth to transfer the content item, determining whether a second bandwidth, of the second network and prioritized for transmitting media having a second media content type, has sufficient available bandwidth to transfer the content item, wherein the second media content type is different from the first media content type; and
      in response to determining that the second bandwidth has sufficient available bandwidth to transfer the content item, transferring, via the second bandwidth, the content item.

2. The method of claim 1, further comprising:
   determining whether a different content item comprises Internet Protocol video content; and
   in response to determining that the different content item does not comprise Internet Protocol video content, encapsulating the different content item into Internet Protocol format and scheduling delivery of the different content item through the second network.

3. The method of claim 1, further comprising:
   in response to determining that the second bandwidth of the second network has insufficient available bandwidth to transfer a different content item, storing the different content item in a queue prioritized over other queued content items having a lower priority than a priority of the different content item, and wherein at least one of the other queued content items has been stored in the queue for a longer duration than the different content item; and
   in response to determining that the second network has sufficient bandwidth to transfer the different content item, transferring the different content item from the queue and using the second network prior to transferring any of the other queued content items having the lower priority than the priority of the different content item.

4. The method of claim 1, wherein the second network transfers content using a reservation transmission scheme different from a time division multiple access transmission scheme.

5. The method of claim 1, further comprising:
   transmitting, by the computing device and to client user device, a notification of a channel over which the content item is to be delivered to the user device, wherein the channel is associated with the second bandwidth.

6. The method of claim 1, further comprising:
   determining that a different content item has the first media content type;
   determining that the first bandwidth, of the second network and prioritized for transmitting media having the first media content type, has insufficient available bandwidth to transfer the different content item;

determining that the second bandwidth, of the second network and prioritized for transmitting media having the second media content type, has insufficient available bandwidth to transfer the different content item; and transmitting, via available un-prioritized bandwidth of the second network and using a best effort delivery transmission scheme, the different content item.

7. The method of claim 1, wherein the first bandwidth and the second bandwidth are associated with particular channels.

8. A method comprising:

receiving, by a computing device, a content item;

determining, by the computing device, that the content item has a first media content type;

determining that a first bandwidth, of a network and prioritized for transmitting media having the first media content type, has insufficient bandwidth to transfer the content item;

in response to determining that the first bandwidth has insufficient available bandwidth to transfer the content item, determining whether a second bandwidth, of the network and prioritized for transmitting media having a second media content type, has sufficient available bandwidth to transfer the content item, wherein the second media content type is different from the first media content type;

in response to determining that the second bandwidth has insufficient available bandwidth to transfer the content item, determining whether a third bandwidth, of the network has sufficient available bandwidth to transfer the content item; and in response to determining that the third bandwidth has sufficient available bandwidth to transfer the content item, transmitting, via the third bandwidth, the content item.

9. The method of claim 8, wherein the transmitting is performed using a best effort transmission scheme.

10. The method of claim 8, further comprising:

receiving, by the computing device, a different content item;

determining, by the computing device, that the different content item has the first media content type;

determining whether the first bandwidth, of the network and prioritized for transmitting media having the first media content type, has sufficient available bandwidth to transfer the different content item;

in response to determining that the first bandwidth has insufficient available bandwidth to transfer the different content item, determining whether the second bandwidth, of the network and prioritized for transmitting media having the second media content type, has sufficient available bandwidth to transfer the different content item; and in response to determining that the second bandwidth has sufficient available bandwidth to transfer the different content item, transmitting, via the second bandwidth, the different content item.

11. The method of claim 8, further comprising:

determining whether a different content item comprises Internet Protocol video content; and in response to determining that the different content item does not comprise Internet Protocol video content, encapsulating the different content item into Internet Protocol format and scheduling delivery of the different content item through the network.

12. The method of claim 8, further comprising:

in response to determining that the second bandwidth of the network has insufficient available bandwidth to transfer a different content item, storing the different content item in a queue prioritized over other queued content items having a lower priority than a priority of the different content item, and wherein at least one of the other queued content items has been stored in the queue for a longer duration than the different content item; and in response to determining that the network has sufficient bandwidth to transfer the different content item, transferring the different content item from the queue and using the network prior to transferring any of the other queued content items having the lower priority than the priority of the different content item.

13. The method of claim 8, further comprising:

transmitting, by the computing device and to a client device, a notification of a channel over which the content item is to be delivered to the client device.

14. The method of claim 8, wherein the first bandwidth, the second bandwidth, and the third bandwidth are associated with particular channels.

15. A system comprising:

a first network;

a second network; and a computing device comprising one or more processors and memory, wherein the memory comprises computer-readable instructions that, when executed by the one or more processors, cause the computing device to:

receive a content item;

determine that the content item has a first media content type; and in response to determining that the first network has insufficient available bandwidth to transfer the content item, determine whether a first bandwidth, of the second network and prioritized for transmitting media having the first media content type, has sufficient available bandwidth to transfer the content item;

in response to determining that the first bandwidth has insufficient available bandwidth to transfer the content item, determine whether a second bandwidth, of the second network and prioritized for transmitting media having a second media content type, has sufficient available bandwidth to transfer the content item, wherein the second media content type is different from the first media content type; and in response to determining that the second bandwidth has sufficient available bandwidth to transfer the content item, transfer, via the second bandwidth, the content item.

16. The system of claim 15, wherein the computer-readable instructions, when executed by the one or more processors, cause the computing device to:

determine whether a different content item comprises Internet Protocol video content; and in response to determining that the different content item does not comprise Internet Protocol video content, encapsulate the different content item into Internet Protocol format and schedule delivery of the different content item through the second network.

17. The system of claim 15, further comprising:

a queue, wherein the computer-readable instructions, when executed by the one or more processors, cause the computing device to:

in response to determining that the second bandwidth of the second network has insufficient available bandwidth to transfer a different content item, store the different content item in the queue prioritized over other queued content items having a lower priority than a priority of the different content item, and wherein at least one of the other queued content items has been stored in the queue for a longer duration than the different content item; and in response to determining that the second network has sufficient bandwidth to transfer the different content item, transfer the different content item from the queue and use the second network prior to transferring any of the other queued content items having the lower priority than the priority of the different content item.

18. The system of claim 15, further comprising:

a user device, wherein the computer-readable instructions, when executed by the one or more processors, cause the computing device to:

transmit, to the user device, a notification of a channel over which the content item is to be delivered to the user device, wherein the channel is associated with the second bandwidth.

19. The system of claim 15, wherein the first media content type comprises one of a video type or a gaming type, and wherein the second media content type comprises an audio type.

20. The system of claim 15, wherein the first bandwidth and the second bandwidth are associated with particular channels.

* * * * *

UNITED STATES PATENT AND TRADEMARK OFFICE
CERTIFICATE OF CORRECTION

PATENT NO. : 9,986,062 B2
APPLICATION NO. : 14/870723
DATED : May 29, 2018
INVENTOR(S) : Salinger et al.

Page 1 of 1

It is certified that error appears in the above-identified patent and that said Letters Patent is hereby corrected as shown below:

On the Title Page

Column 1, Item (*) Notice, Line 3:
Please delete "days. days." and insert --days.--

In the Specification

Detailed Description, Column 11, Line 44:
Delete "5 GhHz)." and insert --5 GHz).--

In the Claims

Claim 5, Column 14, Line 56:
Delete "client" and insert --a--

Signed and Sealed this
Eighth Day of November, 2022

Katherine Kelly Vidal
*Director of the United States Patent and Trademark Office*